United States Patent [19]

Wueschinski et al.

[11] 4,376,968
[45] Mar. 15, 1983

[54] PROTECTION SYSTEM FOR IMMUNIZING AN INVERTER SYSTEM AGAINST A-C LINE VOLTAGE DISTURBANCES

[75] Inventors: Russel P. Wueschinski, Dover, Pa.; Edward C. Siemon, Newfield, N.Y.

[73] Assignee: Borg-Warner Corporation, Chicago, Ill.

[21] Appl. No.: 234,142

[22] Filed: Feb. 13, 1981

[51] Int. Cl.³ .................. H02H 1/06; H02H 7/122
[52] U.S. Cl. .................................. 363/37; 323/243; 323/266; 361/92; 363/54; 363/88
[58] Field of Search ............. 323/237, 243, 246, 266, 323/300; 363/34, 37, 54–58, 86, 88, 128, 50; 318/722, 803, 809; 361/90, 92

[56] References Cited

U.S. PATENT DOCUMENTS

| | | | |
|---|---|---|---|
| 3,473,039 | 10/1969 | Fegley | 363/50 X |
| 3,836,839 | 9/1974 | Becky | 323/243 |
| 3,848,175 | 11/1974 | Demarest | 363/54 X |
| 3,986,100 | 10/1976 | Beierholm et al. | 323/285 |
| 4,027,204 | 5/1977 | Norbeck | 361/92 |
| 4,042,871 | 8/1977 | Grubbs et al. | 363/54 X |
| 4,139,885 | 2/1979 | Overzet | 363/58 |
| 4,218,728 | 8/1980 | Chambers et al. | 363/54 |
| 4,315,305 | 2/1982 | Siemon | 363/88 |

OTHER PUBLICATIONS

Kraengel, "One-Shot Serving as Missing Pulse Dectector Spots Loss of AC Line Voltage Quickly", Electronic Design 11, May 24, 1979, p. 164.

Primary Examiner—A. D. Pellinen
Attorney, Agent, or Firm—James E. Tracy

[57] ABSTRACT

When a-c power line voltage is rectified by a phase-controlled SCR rectifier bridge to develop an adjustable d-c bus voltage which is then converted by an inverter back to a-c for driving a load, such as a motor, line voltage disturbances, resulting from momentary power outages or major power reductions, will have a deleterious effect on the operation of the inverter system. Such disturbances will cause improper firing of the SCR's and the d-c bus voltage may increase considerably, disrupting the normal operation of the inverter system and possibly destroying the switching devices in the inverter. Immunization against the effects of the line voltage disturbances is obtained by shutting down or disabling the phase-controlled SCR rectifier bridge anytime such a disturbance occurs. In this way, while the output voltage of the rectifier bridge is effectively interrupted during the occurrence of each line voltage disturbance, the inverter will continue to operate in near normal manner in response to the d-c voltage provided by the filter capacitor. At the conclusion of each disturbance, the operation of the rectifier bridge will be slowly restored to normal to avoid overshoot of the d-c bus voltage.

6 Claims, 1 Drawing Figure

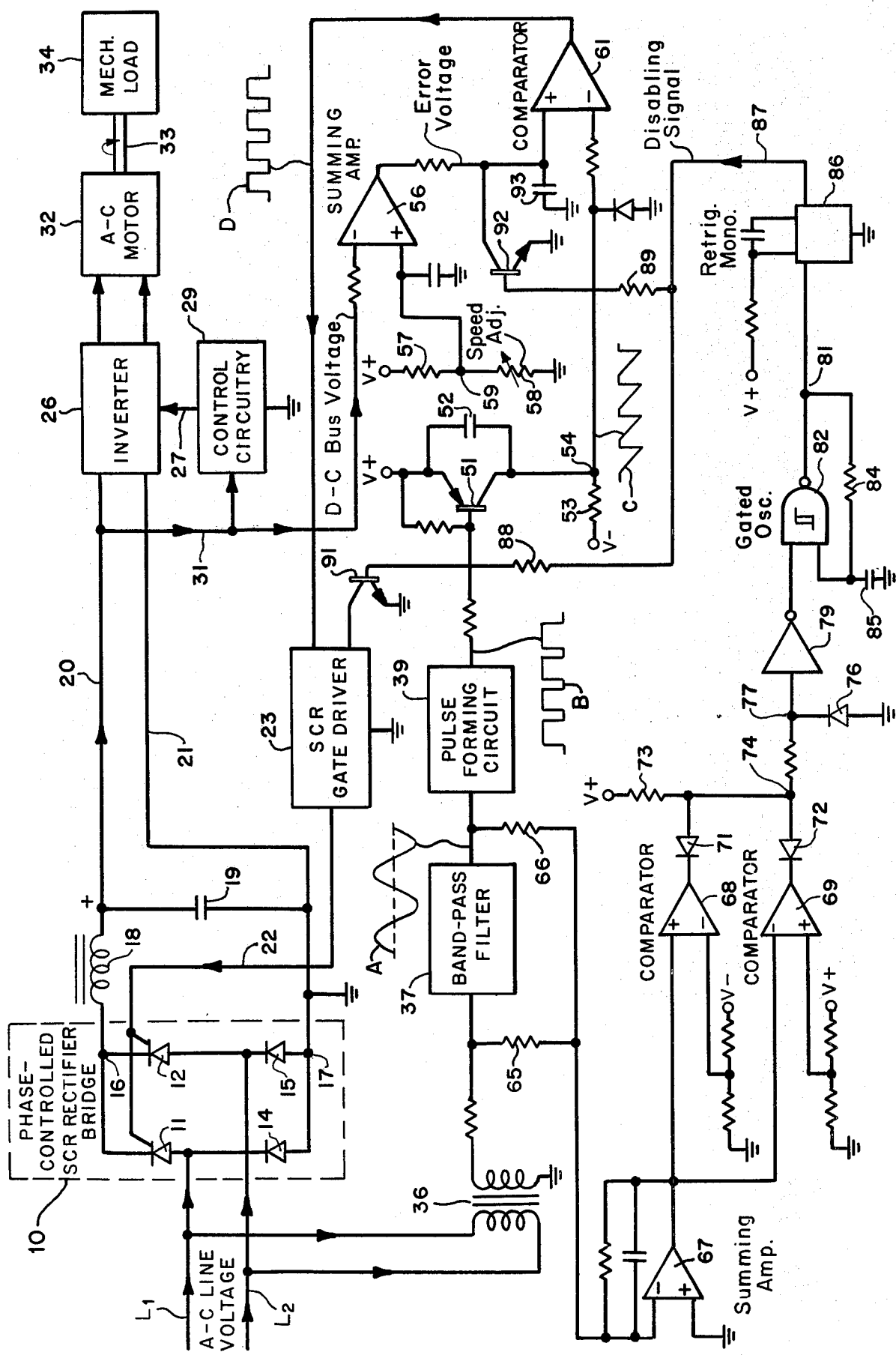

PROTECTION SYSTEM FOR IMMUNIZING AN INVERTER SYSTEM AGAINST A-C LINE VOLTAGE DISTURBANCES

BACKGROUND OF THE INVENTION

This invention relates to a protection system for immunizing an adjustable d-c bus voltage, produced for an inverter by rectifying a-c power line voltage in a phase-controlled SCR rectifier bridge, against the effects of undesired line voltage disturbances resulting from momentary power outages or major power reductions.

A well-known arrangement for developing, for an inverter, an adjustable amplitude d-c bus voltage from a-c power line voltage (either single-phase or three-phase) comprises a phase-controlled SCR rectifier bridge having a plurality of SCR's (silicon controlled rectifiers) whose conduction angles are controlled in order to establish a desired d-c magnitude and to control the power supplied over the d-c bus and through the inverter to the inverter's load circuit, often times an a-c motor. The power flow is controlled by regulating the conduction angles of the SCR's during each half cycle of the applied a-c line voltage. Each SCR can conduct, during each positive polarity half cycle of the voltage applied thereto from the a-c power system, when the SCR's anode is positive relative to its cathode. However, conduction will not occur during a positive half cycle until gate current is supplied to the SCR's gate. At that instant, the SCR fires into conduction, or turns on, and permits load current to flow therethrough until the end of the positive half cycle. The greater the phase angle or time delay between the start of a positive half cycle and the firing of the SCR into conduction, the less the conduction angle and the less alternating current that will be rectified and supplied through the inverter to the load circuit, thereby providing less d-c voltage across the output of the phase-controlled SCR rectifier bridge. Preferably, the rectifier bridge is followed by a low-pass filter (usually a series-connected choke and a shunt-connected capacitor) to minimize the ripple component and smooth out the d-c voltage before it is applied over the d-c bus to the inverter where it is effectively converted to an alternating voltage for application to the inverter's load circuit.

The gating signal must be generated by circuitry which operates in precise synchronism with respect to the instants at which the a-c line voltage crosses its a-c axis and thus has a zero instantaneous amplitude. Unless the operation of the gating signal generator is exactly synchronized to those zero crossings of the line voltage, the timing of the gating pulses will be incorrect and the SCR's will be fired into conduction at the wrong times, resulting in an erroneous d-c bus voltage. High frequency noise superimposed on the a-c line voltage would ordinarily adversely affect the operation of the gating signal developing circuitry and cause misfiring of the SCR's, but such noise can be filtered out and rendered ineffectual. On the other hand, line voltage disturbances or fluctuations, resulting from momentary power outages or major power reductions, present a problem. Such power outages or reductions usually last for less than a full cycle of the a-c line voltage and may be caused, for example, by extremely large loads suddenly placed on the power line, by the power utility company switching power generators, or by lightning which strikes the power line and actuates a lightning arrester. The line voltage disturbances cause filter level shifts which disrupt the required synchronized relationship between the gating pulses and the zero crossings of the line voltage. The SCR's are therefore improperly gated and when the disturbance disappears the SCR's may have a much greater conduction angle than desired, as a consequence of which the d-c bus voltage may overshoot and increase to such an extent that not only would the operation of the inverter's load circuit be significantly altered but, of more importance, circuit components, such as the switching devices (which may be, for example, transistors) in the inverter could be damaged or destroyed.

This problem has been overcome by the present invention. The disclosed protection system ensures that line voltage disturbances will have a negligible effect on the operation of the inverter system, while at the same time preventing circuit component failure or destruction. The present invention thus provides a highly efficient and reliable inverter system which is immune to power line voltage disturbances caused by momentary power outages or major power reductions.

SUMMARY OF THE INVENTION

The protection system of the present invention renders the d-c bus voltage, produced for an inverter by rectifying a-c power line voltage in a phase-controlled SCR rectifier bridge, immune to the effects of line voltage disturbances resulting from momentary power outages or major power reductions. In short, this is achieved by disabling the rectifier bridge in response to the presence of such a disturbance in the a-c line voltage, thereby reducing the rectifier's d-c output voltage to zero. More specifically, the protection system comprises sensing means for detecting the existence of an undesired disturbance in the a-c line voltage, and means, controlled by the sensing means and responsive to the detection of an undesired disturbance, for producing a disabling signal having a duration which extends beyond the termination of the disturbance. Means responsive to the disabling signal are provided for turning the phase-controlled SCR rectifier off.

DESCRIPTION OF THE DRAWING

The features of the invention which are believed to be novel are set forth with particularity in the appended claims. The invention may best be understood, however, by reference to the following description in conjunction with the accompanying drawing which schematically illustrates an inverter system having a protection system constructed in accordance with one embodiment of the invention.

DESCRIPTION OF THE ILLUSTRATED EMBODIMENT

Line conductors $L_1$ and $L_2$ connect to a conventional single-phase a-c power system and thus provide single-phase a-c line voltage varying in sinusoidal fashion at a frequency of 60 cycles per second or hertz and having a normal magnitude of, for example, 240 volts. Of course, the magnitude of the a-c line voltage may take any appropriate value depending on the characteristics of the load to be driven. The a-c energy received over line conductors $L_1$ and $L_2$ is converted to d-c power by a phase-controlled SCR rectifier bridge 10 which is of well-known construction. More particularly, the bridge has a pair of silicon controlled rectifiers or SCR's 11 and 12 and a pair of diodes 14 and 15 which, when the SCR's are fired into conduction by gate current from gate driver 23, rectify the applied a-c power line voltage and develop across the bridge's positive and negative output terminals (designated 16 and 17, respectively) rectified voltage of a magnitude determined by the conduction angles of the SCR's during each half cycle of the applied a-c line voltage. Hence, the amplitude of the d-c voltage across terminals 16 and 17 will depend on the conduction angle of the SCR's during each half cycle, namely the time duration of the portion of each half cycle that the SCR's are gated into conduction, and this in turn will be determined by the timing of the gating pulses received over line 22 from SCR gate driver 23.

A filter comprising series-connected choke 18 and shunt-connected capacitor 19 filter the rectified voltage from bridge 10 to develop a filtered d-c voltage for application to inverter 26 over the d-c bus provided by lines 20 and 21. A positive-polarity d-c bus voltage will therefore appear on line 20 with respect to line 21 which is connected to a ground plane of reference potential or circuit common, zero volts in the illustrated embodiment. Thus, by controlling the conduction angles of SCR's 11 and 12, the d-c bus voltage applied to inverter 26 may be adjusted.

Inverter 26 is of well-known construction, comprising a network of switching devices, such as power transistors, that are controlled by periodically recurring timing pulses received over line 27 (actually a series of conductors, one for each power transistor) from control circuitry 29. The transistors are alternately switched on and off in order to effectively convert the d-c bus voltage, on d-c bus 20, 21, to a-c voltage for application to the windings of motor 32, thereby delivering alternating current to the windings to effect rotation of the a-c motor at a speed determined by and directly proportional to the frequency of the inverter output a-c voltage. The output shaft 33 of motor 32 drives some mechanical load 34. Of course, the construction of control circuitry 29 for supplying base drive current to switch the power transistors in inverter 26 on and off in the correct sequence, at the correct times and at the correct frequency in order to provide the required a-c energy for rotating motor 32 and driving load 34 in the desired manner is well understood by those skilled in the art. Control circuitry 29 operates in response to the d-c bus voltage, received over line 31, and supplies programmed periodically recurring timing pulses, or base drive signals, to the power transistors to establish the frequency of the inverter output voltage and consequently the speed of motor 32. The pulse repetition frequency of the timing pulses will be a function of (specifically directly proportional to) the d-c bus voltage. Hence, the inverter frequency varies when the bus voltage changes. In this way, the amplitude and frequency of the inverter output voltage will have a fixed ratio with respect to each other. A fixed ratio is desirable to avoid overheating of motor 32 and to provide the motor with a constant torque output capability regardless of motor speed.

To develop and control the gating signal for SCR's 11 and 12 in order to adjust the d-c bus voltage and regulate the current flow to inverter 26 and motor 32, thereby adjusting the motor speed, the a-c power line voltage on line conductors $L_1$ and $L_2$ is isolated and stepped down by transformer 36 to provide a reduced amplitude replica of the line voltage for application to band-pass filter 37 which is tuned to the fundamental frequency (60 hertz in the illustrated embodiment) of the power line voltage. Under normal conditions the band-pass filter introduces no phase shift to the fundamental but attenuates both high and low frequencies. The output voltage of filter 37 will thus be a reduced amplitude replica of the line voltage fundamental frequency appearing across line conductors $L_1$ and $L_2$, except 180° out of phase. A low pass filter to attenuate high frequency noise is not employed since it would cause a phase shift in the power line voltage fundamental, as a consequence of which the operation of the gating signal generator would be adversely affected. The alternating voltage produced at the output of filter 37 and having a frequency of 60 hertz is therefore as shown by waveform A in the drawing, the instantaneous amplitude of which varies in sinusoidal manner.

Pulse forming circuit 39 converts each half cycle of the voltage of waveform A to a positive-going pulse component as shown by voltage waveform B. The output voltage of circuit 39 abruptly switches from a low to a high amplitude level immediately after the a-c line voltage crosses its zero axis and begins a new half cycle and then abruptly switches back to its low level just before the line voltage completes that half cycle. Each of the positive-going pulse components in the rectangular-shaped waveform B will therefore extend throughout, and have a pulse width equal to, substantially an entire half cycle of the a-c power line voltage. The leading edge of each positive-going pulse component immediately follows the beginning of a half cycle and its trailing edge occurs immediately before the completion of the half cycle. The preferred construction of pulse forming circuit 39 is disclosed and described in detail in copending U.S. patent application Ser. No. 75,307, filed Sept. 12, 1979, in the name of Edward C. Siemon, and issued Feb. 9, 1982 as U.S. Pat. No. 4,315,305. As taught in that patent, each of the positive-going pulse components of waveform B will have the same identical pulse width even if the line voltage varies. A constant pulse width, regardless of the line voltage magnitude, is required for accurate and reliable performance of the inverter system.

Each of the positive-going pulse components of waveform B is converted to a ramp-shaped pulse (waveform C) of the same width by a pulse-shaping circuit comprising PNP transistor 51 and its associated circuit components. More specifically, the rectangular-shaped voltage signal of waveform B is applied to the base of transistor 51 to drive the transistor alternately between saturation and cut-off, the positive-going pulse components cutting the transistor off while the negative-going pulse components drive the transistor into saturation, rendering it conductive such that a very low impedance will exist between the emitter and collector. When transistor 51 is turned off, capacitor 52 effectively charges in a downward direction (looking at the lower side of the capacitor) through resistor 53 toward the voltage source $V-$, which may for example be $-15$ volts d-c. Hence, during each positive pulse of waveform B the voltage at circuit junction 54 will decrease linearly and form a ramp as shown by waveform C. At the end of each positive pulse, transistor 51 is driven into saturation by a negative-going pulse, whereupon capacitor 52 discharges instantly through the emitter-collector conduction path to terminate the ramp. The voltage at circuit junction 54 therefore abruptly changes to $V+$ (or $+15$ volts d-c if $V-$ is $-15$ volts d-c) since the emitter and collector of the transistor will now be effectively tied together. As shown in waveform C, the voltage at circuit junction 54 remains at V+ during each negative pulse of waveform B. Of course, by maintaining a fixed pulse width for the positive-going pulses of waveform B, the width of each of the ramp-shaped pulses of waveform C will be constant even in the presence of variations in the a-c line voltage across line conductors $L_1$ and $L_2$.

The ramp-shaped pulses of waveform C are utilized to control the operation of SCR's 11 and 12 in order to establish the d-c bus voltage, produced by rectifier bridge 10, at a selected desired amplitude level. To elucidate, the bus voltage is applied via line 31 to the inverting or (−) input of summing amplifier 56, while a d-c reference or set point voltage, provided at the junction 59 of fixed resistor 57 and adjustable resistor 58, is applied to the amplifier's non-inverting or (+) input. Preferably, and as a practical matter, the actual voltage applied to the (−) input of amplifier 56 will be proportional to, but substantially scaled down from, the actual d-c bus voltage on d-c bus 20, 21. For example, the (−) input voltage may be a 100 to 1 reduction of the actual bus voltage. As will be made apparent, the magnitude of the d-c voltage on the d-c bus, and consequently the amplitude and frequency of the inverter output voltage, will be determined by the setting of adjustable resistor 58. Hence, that resistor will constitute a speed adjust control for motor 32, and is so labeled in the drawing. The set point voltage at junction 59 therefore determines the operating conditions and represents a desired amplitude and a desired frequency for the a-c voltage produced by inverter 26 for application to motor 32. Usually, the set point will be selected to satisfy the speed demanded by mechanical load 34.

In effect, the set point voltage at the (+) input of summing amplifier 56 is added, while the (−) input voltage is subtracted. As a result, the output of amplifier 56 provides an error voltage which is a function of the difference between the desired magnitude for the d-c bus voltage (represented by the (+) input voltage) and the actual magnitude of the d-c bus voltage (represented by the (−) input voltage).

Comparator 61 receives the error voltage on its non-inverting or (+) input and the ramp-shaped waveform C on its inverting or (−) input. The amplitude level of the error voltage, regardless of where it is at any given time, will always fall somewhere within the amplitude range covered by the ramp-shaped pulses. At the beginning of a half cycle of the line voltage when the ramp voltage is just starting to decrease, the voltage at the (−) input of comparator 61 will be greater than (or positive with respect to) the voltage at the comparator's (+) input, resulting in a relatively low level output voltage as shown by waveform D. However, at some point during each half cycle the ramp voltage will drop below the error voltage and comparator 61 will abruptly switch from a low level to a high level output voltage where it will remain until the end of the ramp, whereupon the comparator returns to its low level output voltage. For illustrative purposes, waveform D has been drawn to indicate the operating conditions when the error voltage is of an appropriate magnitude to delay the start of a positive-going pulse until about 65° into the 180° half cycle of the line voltage. The control signal (waveform D) controls the operation of SCR gate driver 23 which in turn will produce a gating signal for firing SCR's 11 and 12 into conduction. The gating pulses on line 22 will be generated in response to the leading edges of the positive-going pulses of waveform D. In the illustrated case the SCR's will therefore have a conduction angle of 180° minus 65° or 115°.

Depending on the setting of speed adjust resistor 58, the timing of the gating pulses on line 22 will automatically be adjusted to control the conduction angles so that the d-c bus voltage will be maintained at the magnitude required to drive motor 32 at the selected desired speed. If the d-c magnitude tends to increase, for example, from the required level (thereby tending to increase the motor speed), the error voltage decreases and causes the positive pulses of waveform D to start at a later time during each half cycle, thereby triggering SCR's 11 and 12 into conduction at a greater phase angle (hence a smaller conduction angle) to lower the d-c bus voltage until the correct amplitude level is re-established. Assuming that a higher motor speed is desired, speed adjust resistor 58 will be adjusted to increase the set point voltage at junction 59 so that the error voltage will increase, thereby advancing the leading edges of the positive pulses of waveform D to increase the conduction intervals of the SCR's sufficiently to bring the d-c bus voltage up to the level necessary to drive motor 32 at the new desired faster speed.

Of course, while the motor speed may be changed by manually adjusting the speed adjust resistor 58, the set point voltage may be derived by sensing some parameter or characteristic of the system, in which the disclosed inverter system is incorporated, in order to automatically control the motor speed in response to that sensed information.

Turning now to the invention, the effects of line voltage disturbances, resulting from momentary power outages or major power reductions, on the operation of the gating signal generating circuitry are neutralized by shutting down the phase-controlled SCR rectifier bridge 10 in response to those disturbances, thereby avoiding misfiring of the SCR's and overshoot of the d-c bus voltage. At the same time, the inverter is allowed to continue to operate in response to the voltage stored in filter capacitor 19 so that the disturbances will have a negligible effect on the operation motor 32. To explain, under normal conditions the input and output signals of band-pass filter 37 will be the same, except 180° out of phase. Those phase opposed signals are summed by resistors 65 and 66, as a consequence of which a zero difference signal will be applied to the inverting or (−) input of summing amplifier 67 and zero voltage will appear at the amplifier's output. In the presence of a line voltage disturbance, however, a difference signal will be developed at the (−) input of summing amplifier 67 in the form of a positive-going and/or a negative-going transient or excursion. The output of amplifier 67 will therefore vary positive and negative around zero. The (−) input of comparator 68 is established at a preset minimum negative voltage threshold, while the (+) input of comparator 69 is maintained at a predetermined minimum positive voltage threshold.

The output of amplifier 67 is applied to both the non-inverting or (+) input of comparator 68 and to the inverting or (−) input of comparator 69. Thus, negative-going excursions which exceed (namely are negative with respect to) the negative threshold of comparator 68 will trigger the comparator so that its output voltage will be established at its relatively low level, preferably V− or −15 volts d-c in the illustrated embodiment. Similarly, positive going excursions exceeding (positive relative to) the positive threshold of comparator 69 actuate the comparator to its low output voltage (V−) state. As a result, a disturbance renders one or both of diodes 71 and 72 conductive and current flows from potential source V+ and through resistor 73 and the conducting diode(s) to establish circuit junction 74 at V− or −15 volts d-c. Diode 76 conducts in response to this voltage in order to clamp junction 77 at zero volts when a disturbance occurs.

The zero voltage at junction 77 is converted by inverter 79 to a relatively high voltage (V+ or +15 volts d-c) which turns the gated oscillator on to produce an oscillating signal at circuit junction 81. The gated oscillator includes NAND gate 82 (functioning as a schmitt trigger), feedback resistor 84 and capacitor 85. The oscillator will be gated on as long as V+ voltage is received from the output of inverter 79. The oscillating frequency may be around 100 kilohertz, although the specific frequency is not critical.

During a line voltage disturbance, circuit junction 81 will therefore oscillate or swing between V+ and zero volts and, in response to the first cycle of oscillations, the retriggerable monostable multivibrator 86 will be actuated from its normal stable condition to its abnormal condition where it will remain for a discrete time interval following the termination of the disturbance. At the end of the time interval, and therefore after the a-c power line voltage has returned to normal, monostable multivibrator 86 automatically returns to its normal state or condition. In this way, the output voltage on line 87, which is called the "disabling signal," is established at zero volts until a disturbance occurs, whereupon it instantly increases to V+ and stays there until after the disturbance has passed and after the line voltage has resumed normal sinusoidal variations, at which time the output voltage, or disabling signal, returns to zero.

The positive-going pulse components of the disabling signal are applied through resistors 88 and 89 to the bases of NPN transistors 91 and 92 to turn those transistors on and drive them into saturation. When transistor 91 conducts, SCR gate driver 23 becomes inoperable so that no gating signal will be supplied over line 22 to rectifier bridge 10, thereby shutting the bridge down so no line voltage will be rectified. During this shut down time the d-c bus voltage across filter capacitor 19 will slowly decay, thereby maintaining control circuitry 29, inverter 26 and motor 32 operating in almost normal fashion. Hence, the disabling signal will render bridge 10 ineffective during a line voltage disturbance, but this will have a negligible effect on the operation of motor 32.

During the disturbance and while bridge 10 is disabled, the slowly collapsing d-c bus voltage at the (−) input of summing amplifier 56 will ordinarily cause the error voltage to increase, and this increasing error voltage will be stored in capacitor 93. In the absence of transistor 92, after the disturbance has passed and gate driver 23 and rectifier bridge 10 have returned to normal operation, the relatively high error voltage on capacitor 93 would call for a large conduction angle for SCR's 11 and 12 and the d-c bus voltage would overshoot. Such abnormally high bus voltage would speed up the motor and could damage or destroy the power transistors in inverter 26. By turning transistor 92 on during and immediately following the disturbance, capacitor 93 will be discharged and the error voltage will be zero when normal operation is resumed. This not only guarantees a soft transition back to normal operation, but it prevents the failure of circuit components.

The invention provides, therefore, a unique arrangement for immunizing the d-c bus voltage against the effects of undesired line voltage disturbances. The disturbances are neutralized in such a way that the load driven by the inverter system operates substantially normally during the disturbance. A salient feature of the invention resides in the manner in which the circuit components, particularly the switching devices in the inverter, are prevented from destruction by the line voltage disturbances.

While a particular embodiment of the invention has been shown and described, modifications may be made, and it is intended in the appended claims to cover all such modifications as may fall within the true spirit and scope of the invention.

We claim:

1. A controlled d-c power supply for rectifying applied a-c power line voltage to develop therefrom a d-c bus voltage of a desired magnitude for application to an inverter, the a-c line voltage being subject to unwanted disturbances caused by momentary power outages or major power reductions, comprising:

a phase-controlled SCR rectifier bridge, having at least two SCR's, for rectifying the a-c line voltage to produce d-c bus voltage of a magnitude determined by the conduction angle of the SCR's during each half cycle of the a-c power line voltage;

pulse generating means, responsive to a reduced amplitude replica of the a-c line voltage, for developing a ramp-shaped pulse during each half cycle of the a-c line voltage and including a band-pass filter for attenuating, in the reduced-amplitude replica of the a-c line voltage, frequencies above and below the voltage's fundamental frequency;

control means for utilizing the ramp-shaped pulses to trigger said SCR's into conduction at a desired phase angle, following the beginning of each half cycle of the a-c line voltage, thereby to control the conduction angle in order to establish the d-c bus voltage at a selected desired amplitude level;

sensing means which compares the input and output signals of said band-pass filter in order to detect the unwanted disturbances in said a-c line voltage caused by momentary power outages or major power reductions;

and disabling means, controlled by said sensing means, for turning said SCR's off during the occurrence of each unwanted disturbance, thereby rendering the d-c power supply immune to such disturbances.

2. A protection system for immunizing an adjustable d-c bus voltage, which is applied to an inverter, against undesired a-c power line voltage disturbances resulting from momentary power outages or major power reductions, where the d-c bus voltage is produced by rectifying the a-c power line voltage in a phase-controlled SCR rectifier bridge, comprising:

sensing means for detecting the undesired line voltage disturbances caused by momentary power outages or major power reductions and including a filter to the input of which is applied a replica of the a-c line voltage, the undesired line voltage disturbances being detected by comparing the filter's output signal with its input signal;

and disabling means, controlled by said sensing means, for rendering the phase-controlled SCR rectifier bridge ineffective during the occurrence of each line voltage disturbance.

3. A protection system according to claim 2 wherein said filter is a band-pass filter which attenuates frequencies above and below the line voltage's fundamental frequency.

4. A protection system according to claim 3 wherein said sensing means includes a summing amplifier which responds to the difference between the input and output signals of said band-pass filter, and wherein comparison means are coupled to the output of the summing amplifier to detect positive-going or negative-going excursions, which exceed preset minimum threshold levels, in the amplifier's output signal.

5. A protection system according to claim 4 wherein said comparison means control a gated oscillator which in turn operates a retriggerable monostable multivibrator to produce a disabling signal for disabling the phase-controlled SCR rectifier bridge in response to the detection of each undesired line voltage disturbance, the disabling signal maintaining the rectifier bridge disabled for a predetermined discrete time interval following the termination of each disturbance.

6. A protection system according to claim 5 wherein the phase-controlled SCR rectifier bridge is normally controlled by a gating signal received from an SCR gate driver which in turn is operated in response to an applied control signal in order to maintain the magnitude of the d-c bus voltage at a desired magnitude, and wherein said disabling signal also effectively eliminates the control signal during the occurrence of a line voltage disturbance.

* * * * *